United States Patent
Ludwig et al.

(10) Patent No.: US 8,458,189 B1
(45) Date of Patent: Jun. 4, 2013

(54) AUTOMATIC TAGGING BETWEEN STRUCTURED/UNSTRUCTURED DATA

(75) Inventors: Hans-Martin Ludwig, Sandhausen (DE); Thomas Mueller, Wiesloch (DE); Florian Kresser, Lobbach (DE); Thomas Finke, Hockenheim (DE); Daniel Buchmann, Eggenstein (DE); Marieta Koch, Heidelberg (DE); Karl Fuerst, Wiesloch (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/305,716

(22) Filed: Nov. 28, 2011

(51) Int. Cl.
*G07F 17/30* (2006.01)

(52) U.S. Cl.
USPC ........... 707/741; 707/709; 707/737; 707/758; 706/20

(58) Field of Classification Search
USPC ................. 707/709, 737, 741, 758, 999.001, 707/707; 706/20
See application file for complete search history.

(56) References Cited

U.S. PATENT DOCUMENTS

| | | | |
|---|---|---|---|
| 7,849,048 B2 * | 12/2010 | Langseth et al. | 707/602 |
| 7,908,274 B2 * | 3/2011 | Zartler et al. | 707/736 |
| 2005/0108211 A1 * | 5/2005 | Karimisetty et al. | 707/3 |
| 2005/0108212 A1 * | 5/2005 | Karimisetty et al. | 707/3 |
| 2006/0020466 A1 * | 1/2006 | Cousineau et al. | 704/257 |
| 2006/0067334 A1 * | 3/2006 | Ougarov et al. | 370/396 |
| 2006/0287890 A1 * | 12/2006 | Stead et al. | 705/3 |
| 2007/0011134 A1 * | 1/2007 | Langseth et al. | 707/1 |
| 2007/0143235 A1 * | 6/2007 | Kummamuru et al. | 706/15 |
| 2009/0187581 A1 * | 7/2009 | Delisle et al. | 707/100 |
| 2009/0299977 A1 * | 12/2009 | Rosales | 707/3 |
| 2011/0173153 A1 * | 7/2011 | Domashchenko et al. | 707/608 |

* cited by examiner

*Primary Examiner* — Dennis Truong
(74) *Attorney, Agent, or Firm* — Mintz Levin Cohn Ferris Glovsky and Popeo, P.C.

(57) ABSTRACT

A system and method for establishing cross-relationships between objects is presented. A primary search is executed on a first object. A set of tagger identifiers is then determined based on the primary search. Each tagger identifier includes an internal instance key and one or more attributes of a match with the first object related to the primary search, and each tagger identifier of the set of tagger identifiers provides data for a secondary search. The secondary search is then executed on each of a secondary object that is tagged by the first object scanned by the primary search, the secondary search using the internal instance key and one or more attributes of the match with the first object.

18 Claims, 2 Drawing Sheets

AUTOMATIC TAGGING BETWEEN STRUCTURED/UNSTRUCTURED DATA

TECHNICAL FIELD

The subject matter described herein relates to search engines, and more particular to automatic tagging between structured and unstructured data in an enterprise search system. The search system may support any formats including text formats and others, e.g. numeric data, date/timestamp contents, deeply nested structures, and also bitmaps, images or other raw formats. Objects can be structured, non-structured, or combinations thereof.

BACKGROUND

In conventional search systems, determination of cross-object relationships without leveraging the capabilities of a search engine include directly checking for value equality in certain fields, and automated rule-based text analysis (as for example available with text analysis solutions such as Inxight). Such matching based on attribute equality or similar methodologies which do not involve the search engine can only work on structured data. Further, a simple evaluation of name equalities on selected attributes between a first object and a second object having some match or relationship with the first object fails to leverage the entire range of capabilities available with a search engine for the matching.

SUMMARY

In the following we will name the start and end objects between which the relationships shall be established as "Tagger" and "Taggee" objects. These terms are derived from the notion that taggee object entities are being 'tagged' with Tagger object entities.

In one aspect, a computer-implemented method for establishing cross-relationships between objects is disclosed. The method includes the steps of executing, by one or more processors of an enterprise search system, a primary search on a first object. The method further includes determining, by the one or more processors, a set of tagger identifiers, each tagger identifier including an internal instance key and one or more attributes of a match with the first object related to the primary search, each tagger identifier of the set of tagger identifiers providing data for a secondary search. The method further includes executing, by the one or more processors, the secondary search on each of a secondary object that is tagged by the first object scanned by the primary search, the secondary search using the internal instance key and one or more attributes of the match with the first object.

In some variations one or more of the following can optionally be included. For example, in some implementations, the primary search includes scanning all object instances within a database without accounting for a last update timestamp of each associated object.

The systems and methods described herein can be used for automatic tagging of object instances, generally establishing relationships of any kind and semantic between objects. The process can also be used in combination with text analysis, implementing a quick pre-analysis which is then fed into the actual text analysis tool as a set of "hit proposals" for further verification/falsification by the text analysis.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a fast and robust technique of establishing cross-relationships between structured and/or unstructured objects of any kind based on a customizable set of criteria suited to relate entities to each other by leveraging search functionality. The methods, systems, and articles of manufacture include a-priori asymmetric establishment of cross-relationships, although the resulting relationships can be symmetric in their meaning, and though it can be implemented in a bi-directional way by reversing the sequence of objects and formulating the criteria in the opposite direction.

In this document, the start and end objects between which relationships are established will be referred to as Tagger and Taggee objects. In the automatic tagging process, the Tagger is the item or item type that yields the test values, and the Taggee is the item or item type whose textual content is to be analyzed.

These terms are derived from the notion that Taggee object entities are being 'tagged' with Tagger object entities; these names however shall not imply a restriction of the application of this description to any kind of "tagging" use-cases only, or in fact to any particular semantics the established relationships could carry. The process/mechanism/algorithm outlined herein analyzes Taggee object entities by means of search for presence of matching criteria, which in the same process are derived or excerpted from Tagger object entities, similarly by means of search. This document handles the use cases of: (1) initial cross-object establishment of relationships; (2) delta handling on Tagger changes; and (3) delta handling on Taggee changes.

The processing mechanism is fully mass-enabled and thus faster than conventional technologies such as rule-based text analysis which have to scan/parse the content of each Taggee instance line-by-line to check for matches. Since criteria are not "fixed" but can be added/removed on the fly by adding/removing/modifying Tagger objects, the processing mechanism is more dynamic than conventional text analysis which works on a predefined fixed set of rules and/or static files which define the entities to be matched. Finally it is even possible to leverage the cross-object search capabilities of a search engine which allows to process different Tagger/Taggee combinations at a time. This especially aids in the delta handling compared to conventional techniques, because if, for example, a Tagger instance changes and there are multiple Taggee objects to be processed (i.e., TAGGEE_1, TAGGEE_2, . . . ) all of the Taggee objects can be determined in a single cross-object search. Accordingly, the process and processing mechanism is faster and more flexible than conventional techniques.

Figure 1:
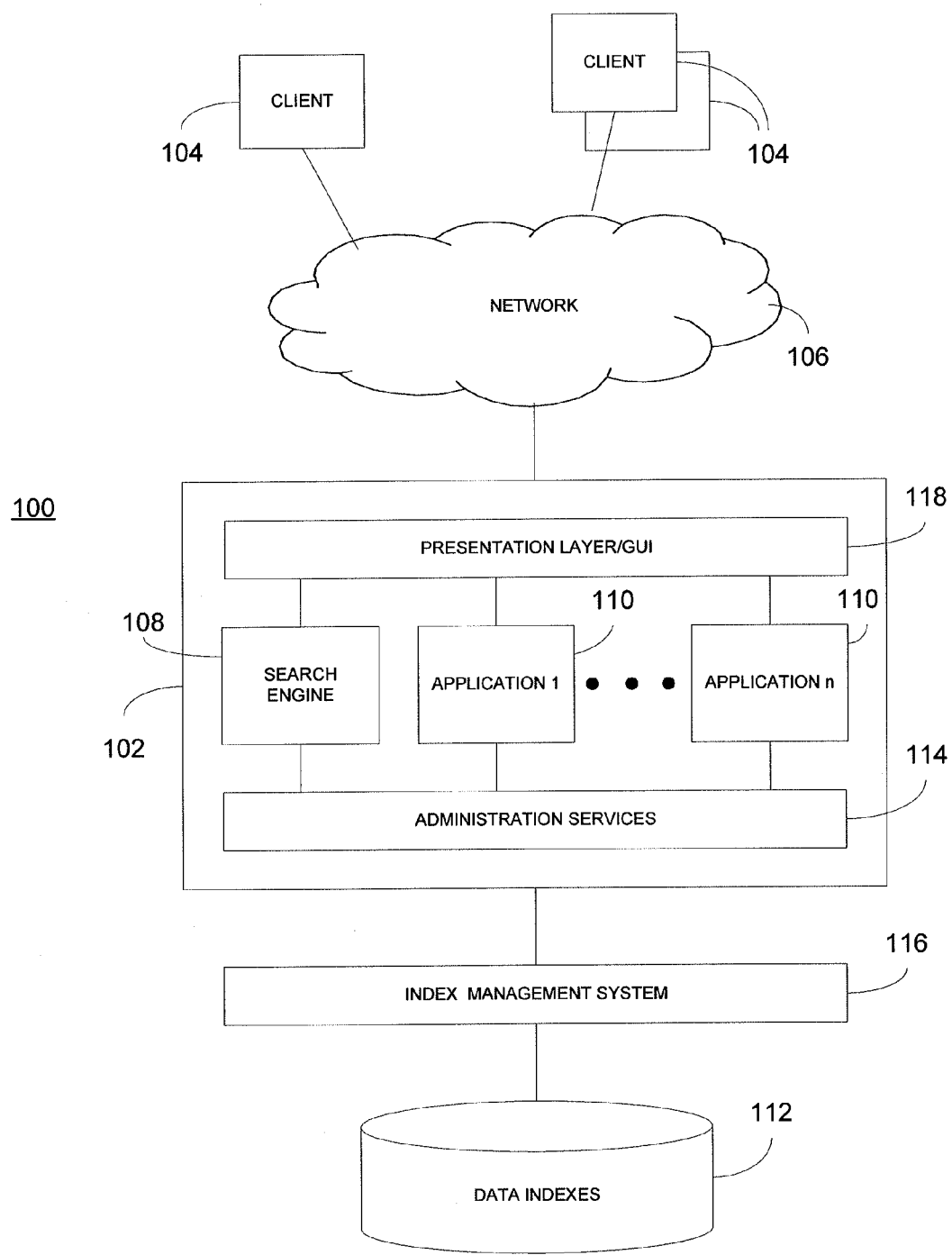
FIG. 1 is a diagram illustrating aspects of a system showing features consistent with implementations of the current subject matter.

It is assumed that the objects Tagger and Taggee are indexed and searchable via a search mechanism such as, but not limited to, SAP Enterprise Search or similar search engine. FIG. 1 is a block diagram of an enterprise search system 100, in accordance with exemplary implementations. The enterprise search system 100 includes an application infrastructure 102 that hosts a search engine 108 and one or more business applications 110, each of which search data stored in searchable data indexes 112, which can be implemented as tables or joins/views on a database or on any other system capable to store/retrieve data, or held in memory inside the search server or an associated component. The application infrastructure 102 can be implemented as one or more server computers or server computing environments. The search engine 108 and/or the one or more business applications 110 can be hosted by a server computer and executed in a service-oriented runtime environment.

The application infrastructure 102 executes search requests on the data indexes 112 from the one or more client computers 104 as managed by administrative services 114. The administrative services 114 interface with an index management system 116 to format and execute the searches of objects stored in the data indices 112. Results of the searches are processed and presented by a presentation layer 118, which provides and serves a graphical user interface (GUI) to the one or more client computers 104 via the network 106.

The application infrastructure 102 communicates with one or more client computers 104 via a communication network 106. The communication network 106 can be any collection of network devices and media that enable communications between the client computers 104 and the application infrastructure 102.

It is also assumed that when changes to instances of the Tagger and/or Taggee objects are made, the events are known either in the search engine or in the application which makes these changes, and that either the search engine or the application is able to notify the processing mechanism described below whenever such changes occur. This is prerequisite for the delta handling use cases highlighted above. To be able to leverage search capabilities for determining changes on the Tagger and the Taggee side, it is further assumed that the timestamp of the last update of each Tagger and Taggee instance is persisted together with the instance itself in the search engine.

Figure 2:
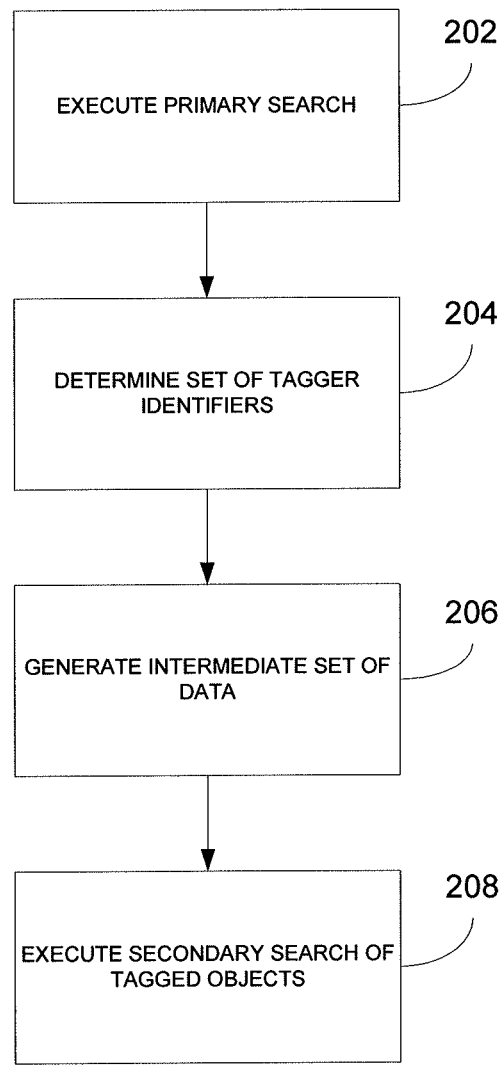
FIG. 2 is a process flow diagram illustrating aspects of a method having one or more features consistent with implementations of the current subject matter.

FIG. 2 is a process flow diagram illustrating a process 200 for automatic tagging between structured/unstructured data. At 202, a primary search is executed on a first object. At 204, a set of tagger identifiers is determined. In some implementations, each tagger identifier includes an internal instance key and one or more attributes of a match with the first object related to the primary search. Further, each tagger identifier of the set of tagger identifiers provides data for a secondary search. At 206, an intermediate set of data is generated. At 208, the secondary search is executed on each of a secondary object that is tagged by the first object scanned by the primary search. The secondary search using the internal instance key and one or more attributes of the match with the first object. These and other process steps are explained in further detail below.

Initial Cross-Object Establishment of Relationships

For the initial use case, the processing mechanism includes a primary search on the Tagger object, scanning all object instances initially without taking the last update timestamp into account. This search returns the Tagger identifiers (IDs), which can be the internal instance key, plus any kinds of Tagger attributes to be used as criteria for the matching. Depending on data volume and implementation, this mechanism can be processed in a single step, or in a blocked manner. The result is an intermediate set of data that will then be used as input for a search on the Taggee side.

The Tagger object result list is then used as input for a second search on the Taggee side, which determines all documents which contain or refer to the values in the list. The results of both searches can be matched, which results in a set of matching list of Tagger/Taggee instances which can be returned or persisted/indexed as tags. Consider following set of objects (each with a sample set of attributes):

A. Documents
doc title
creation date
doc content
B. E-Mails
from email-address
to email-address(es)
send/received dates
subject
body
C. Customers
CustID
Name: Firstname, Lastname
Company
Address(es): Street, Housenumber; Postcode, City
Phone number(s), E-Mail address(es)
D. Products
ProdID
Name
. . .

Note that some of the objects contain unstructured attributes, e.g. document content, or email body.

These objects may reference each other. In the example, assume that Documents and Emails can refer to Customers and Products, e.g. a document might mention a customer name, CustID, or a customer email address in the content, and the email object instance could refer to a customer in the from/to email addresses (i.e. in the structured part of the object) or in the body (i.e. in the unstructured part). There need be no assumptions made as to whether the reference is in the structured or unstructured part.

In the process below, the objects Documents (and E-Mails) are treated as Taggee objects and Customers (and Products) as Tagger objects. The process to get the tags is directional, starting with Tagger and retrieving associated Taggees. This is for convenience, as one direction is typically more efficient than the other, and this guides which object to select as Taggee or Tagger. However, the process also works the other way round.

The resulting 'tags' can later be used symmetrically. In one example, a query for the search engine is as follows:
  a) I have one customer (known by ID, eg. from a previous search) and want to find the best-matching set of documents (or: e-mails) referring to this customer.
  b) I have a set of documents and want to find the best-matching list all customers (/products) the document refers to.

In the example, tagging is considered for objects Document and Customer only. The Tag index T for this case would look like the following:
  T. Tags(Docs/Customers)
  Doc ID
  Cust ID The tag entities hold the relationship between document and customer IDs, with the notion "doc1 is tagged with cust1 (and vice versa)." In a real life scenario the tag entity may be enriched with further qualifying attributes, e.g. as follows:
  T. Tags(Docs/Customers) [Enhanced]:
  Doc ID
  Cust ID
  Quality/Semantic of tag
  Weight of tag
  . . .
  Typically the tag is kept separate from the application data, i.e. it would not be part of the Cust or Doc objects. The info is only used while executing queries on the search engine.

Process of Tagging

The process starts with a customized set of "rules" or "criteria", such as "If anything . . . ". The rules are imported or provided as customizing settings, are stored somewhere in the search engine and should be able to be modified or enhanced anytime. Based on this a query is formulated, to operate on the Tagger object (TAGGER QUERY, Query 1). The Query formulation need not be explicit (e.g. need not be SQL or the like, but can be anything the search engine is able process). The Tagger query will in general be static, i.e. independent on Tagger/Taggee content, and only involve the Tagger object attributes addressed in the ruleset in question.

The process does not require user input. It could for example be triggered by background job, or at the actual point of time of activation or change of the ruleset. The Tagger query is applied to the contents of the Tagger object, potentially in a blocked way (to avoid overflow as numbers of objects to be processed may be huge). It results in intermediate sets of Tagger instances, e.g. all customers with their IDs, names, address data, phone numbers, and email addresses, whereby depending on cardinality of criteria attributes (i.e., a customer can have multiple phone numbers), a given entity can occur once or multiple times in the intermediate Tagger result set.

In the list entities can occur multiple times, depending on normalization and/or cardinality of the attributes, which is in contrast to normal search execution where multiple entries in the result set are not intended. Important for the process is that the list comprises all (tagging-relevant) Tagger attributes and that each row contains the reference to the ID(s) which will form part of the tag in the end.

Assume for the following discussion that the resulting intermediate list (result of tagger query) looks as follows:

| ID | Name.First | Name.Last | Addr.St | Addr.City | Tel |
|---|---|---|---|---|---|
| Cust01 | Peter | Brown | Main Ave. | Boston | +001 234 5678 |
| Cust01 | Peter | Brown | Main Ave. | Boston | +001 999 9099 |
| Cust02 | Susan | Miller | North St. | New York | +001 707 7007 |
| Cust03 | Claudia | Green | Cedar Blvd. | Los Angeles | +001 444 4400 |
| Cust03 | Claudia | Green | New St. | Toronto | +001 555 5511 |
| Cust03 | Claudia | Green | New St. | Toronto | +001 555 5522 |
| Cust04 | Sue | Peter | West Ave. | New York | +001 811 1481 |
| Cust05 | Randy | Smith | Long St. | Washington | +001 321 4321 |

The intermediate list is taken to create/generate a second query (TAGGEE QUERY, Query 2) to be applied to the Taggee object, which in contrast to the TAGGER QUERY is dynamically formulated, using the results of the TAGGER QUERY as input. Also this step need not be done explicitly, it can happen internally/on-the-fly; in some cases the search engine may even be able to return the result of query 1 as an internal query 2 so that no reformatting is required.

The TAGGEE QUERY will in general be formulated as a "bulk" query. There will be one query call to the search engine, searching the object indices for Document, with a query which in the example could appear as follows:

{(SUBQUERY1: (Namefirst='Peter' AND NameLast='Brown')

OR (Addr.St='Main Ave' AND Addr.City='Boston')

OR (Tel=+001 234 5678))

(SUBQUERY2: (Namefirst= . . . ) OR ( . . . ) . . . )

(SUBQUERY3: (Namefirst= . . . ) . . . )

. . . . . .

(SUBQUERYn: ( . . . . . . )}

Each row/instance of the intermediate result appears as a 'subquery' within the bulk query, to achieve grouping of the results by subquery for subsequent matching.

The constructed query is simplified here for example purposes only; in a real-life implementation the dynamically generated query will in general be much more complex, for example to take care of variations in formatting within the Taggee object content, or to facilitate the desired grouping and/or sorting/ranking/weighting of the results. This query is then applied to the Taggee object.

Let's assume the Taggee object (Documents) contains instances with following text (displaying relevant excerpts):

| ID | Name.First |
| --- | --- |
| Doc01 | ... requested to phone her back at +001 707 7007 immediately ... |
| Doc02 | ... orders have been delivered to the shop at Cedar Blvd., Los Angeles ... |
| Doc03 | ... Sue Peter is our best customer in new York ... |
| Doc04 | ... the shop in New St. Toronto does better than the one in Long St. Washington ... |
| Doc05 | ... Mr Smith (+001 321 4321) called at 15:00EST to order a new shipment ... |

Based on this, the Taggee query would return a result set of following result:
{SUBQUERY1 (–)
SUBQUERY2 (–)
SUBQUERY3 (Doc01)
SUBQUERY4 (Doc02)
SUBQUERY5 (Doc04)
SUBQUERY6 (Doc04, too-duplicate)
SUBQUERY7 (Doc03)
SUBQUERY8 (Doc04, Doc05)
}

The implementation via a bulk query with subqueries is only an example implementation. Any other search technique yielding the same results, including one-by-one execution of the subqueries, can also be employed. Duplicates may appear, and depending on normalization of the intermediate result, they can be eliminated. Matching the two result sets would result in the following tags:

| Cust ID | Doc ID |
| --- | --- |
| Cust02 | Doc01 |
| Cust03 | Doc02 |
| Cust03 | Doc04 |
| Cust04 | Doc03 |
| Cust05 | Doc04 |
| Cust05 | Doc05 |

As said, the tags resulting from the process can (and will in general) be persisted as separate object entities in a separate index. Subsequent actual search queries such as:
 a) "Get all docs pertaining to Customer [Name.first=]Claudia [Name.last=]Green" (Cust03),
 b) "Get the customers referenced in Doc04"
can be executed immediately based on the final result shown above. These are queries which can be executed by a search client or end user and might be performance critical.

The technique enables the search engine to execute queries on object A via request criteria from object B, without application (or end users) having to provide the links between the instances. Note e.g. that for query a) from above, none of the documents Doc2 and Doc4 actually have to contain the name "Claudia Green". Of course, the resulting sets of tags can finally be enhanced, reviewed, cross-examined, validated, or otherwise edited, either manually or by other automatic processes such as standard rule-based text analysis etc., e.g. to eliminate false-positives or to add missing combinations.

Delta Handling on Tagger Changes

For delta handling on Tagger changes, the process is similar to that of the initial handling. The search engine, or alternatively, the application sending of the changes to the Tagger object instances, notifies the mechanism/algorithm about new changes on Tagger side. It is not required that the changes be notified in detail, only the fact that changes have occurred needs to be notified. The delta process is started immediately upon receiving the notification (real-time triggering). Alternatively, the process is started on a periodic basis (scheduled triggering of the Tagger change delta process).

Irrespective of the triggering mechanism, on start of the delta process for Tagger changes, a search for the newly-changed Tagger instances is fired. In contrast to the initial use-case, this search in the delta process also takes the timestamp of the last execution into account as an additional search criterion, which is provided in addition to the other search criteria for the Tagger object, restricting the resulting intermediate set of Tagger instances to the ones which are newer than the last-execution timestamp. These instances are then used as a basis for search on the Taggee side, similarly as in the initial use-case. The result is a list of matches that can be used to determine the delta (matches to be added, matches to be removed) by comparison with the already-persisted state of matches for the given Tagger instances.

Delta Handling on Taggee Changes

Delta handling on Taggee changes is processed similarly to delta handling on Tagger changes. The reason changes on the Taggee side are treated in a separate process than changes on the Tagger side is due to the asymmetric nature of the specified process. Of course, if the matching-criteria can be reversed (i.e., applied in the opposite direction) between the Tagger and the Taggee in a bijective way, it is possible to exchange the Tagger and Taggee side for processing of Taggee changes. In this case, the use case processes of delta handling on the Taggee side is the same as the use case processes of delta handling on the Tagger side, although (processed in the opposite direction using reversed criteria.

Reversing would work the following way: Let A and B be the two objects. If A changes, the processing mechanism searches A with "forward-criteria" to search B; if B changes the processing mechanism searches B with reversed "backward-criteria" to search A. The results will be identical, provided that it is possible to reverse all criteria 1:1. If reversing of criteria is not possible (i.e. in a general case, especially when unstructured data is involved), a separate process for delta handling on Taggee changes is required, as follows.

Triggering for delta handling on Taggee changes works the similarly as triggering in case of changes on the Tagger side, i.e. triggering either via notification from the search engine or the application (real-time triggering for changes on Taggee side), or per periodic scheduling, thus implementing a periodic check for changes on Taggee side. This use case process first determines all potentially available Tagger instances, not evaluating any time-stamp criteria on the Tagger side, and uses the result set for a subsequent search on the Taggee side, similar to the preceding use cases. However, in contrast to the preceding use cases, the timestamp restriction is applied on the second search on the Taggee side, restricting the result set to newly-updated Taggee instances only, and thus using the last-update timestamp of the Taggee instances as additional search criterion in addition to the criteria derived from the Tagger-side search. Also in this case, the resulting set is used to determine the delta (matches to be added, matches to be removed) by comparison with the already existing state, but this time based on the Taggee instance.

The processing mechanism is more than a simple evaluation of name equalities on selected attributes between Tagger and Taggee, because it leverages the entire range of capabilities available with a search engine for the matching. Matching based on attribute equality or similar methodologies that do not involve a search engine can only work on structured data. However, the processes described herein are able to match at any location in structured or unstructured data leveraging the search engine capabilities of "freestyle search" across any structured or unstructured content of object instances. These processes are additionally able to locate almost-matches (e.g. eliminating spelling errors in the criteria-relevant values on the Tagger or Taggee side) using search options such as fuzzy-search. Moreover, by leveraging the bulk search capabilities of a search engine, the processing mechanism can process large numbers of Tagger and Taggee instances at a time.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   executing, by one or more processors of an enterprise search system, a primary search on data associated with a first object of a plurality of objects, each object comprising a plurality of attributes used to categorize data associated with the object, the primary search including scanning all object instances within a database without accounting for a last update timestamp of each associated object;
   determining, by the one or more processors, a set of tagger identifiers, each tagger identifier including an internal instance key and values of one or more attributes of the first object that are obtained in response to the primary search, the internal instance key characterizing an identifier associated with an instance of the first object, the instance comprising the internal instance key and the values of one or more attributes of the first object; and
   executing, by the one or more processors, the secondary search on data associated with one or more secondary objects tagged with the first object to generate cross-relationships between one or more internal instance keys and values of one or more attributes of the second object, the secondary search using the internal instance key and the values of the one or more attributes of the first object.

2. A system comprising:
   at least one programmable processor; and
   a machine-readable medium storing instructions that, when executed by the at least one processor, cause the at least one programmable processor to perform operations comprising:
   executing a primary search on data associated with a first object of a plurality of objects, each object comprising a plurality of attributes used to categorize data associated with the object, the primary search including scanning all object instances within a database without accounting for a last update timestamp of each associated object;
   determining a set of tagger identifiers, each tagger identifier of the set of tagger identifiers providing data for a secondary search, each tagger identifier comprising an internal instance key that characterizes an identifier associated with an instance of the first object, the instance comprising the internal instance key and values of one or more attributes of the first object that are obtained in response to the primary search; and executing the secondary search on one or more secondary objects tagged with the first object to generate cross-relationships between values of one or more attributes of the first object and values of one or more attributes of the second object.

3. The system in accordance with claim 2, wherein each tagger identifier further comprises the values of one or more attributes of the first object.

4. The system in accordance with claim 3, wherein the secondary search uses the internal instance key and the values of one or more attributes of the first object.

5. The system in accordance with claim 2, wherein the primary search includes scanning all object instances within a database without accounting for a last update timestamp of each associated object.

6. The system in accordance with claim 2, wherein the primary search and the secondary search are executed on indices of data.

7. A non-transitory computer readable storage medium storing instructions that, when executed by at least one programmable processor, cause the at least one programmable processor to perform operations comprising:

generating a first search query based on one or more rules, the first search query querying a database comprising values of attributes of a plurality of objects, the first search query querying data associated with a first object without accounting for a last update stamp of the first object;

receiving a first search result in response to the querying by the first search query, the first search result comprising values of attributes of the first object for a plurality of instances of the first object, each instance of the first object including an internal instance key characterizing an identifier associated with an instance of the first object, the instance comprising the internal instance key and the values of attributes of the first object, the internal instance key and the values of attributes being included within a tagger identifier;

generating a second search query comprising a plurality of subqueries, each subquery including values of corresponding one or more attributes of the first object, the plurality of subqueries querying data associated with a second object tagged with the first object;

receiving a second search result in response to the querying by the plurality of subqueries, the second search result including a plurality of instances of the second object; and generating, based on the first search result and the second search result, cross-relationships between one or more instances of the first object with one or more instances of the second object, the cross-relationship characterizing associations between one or more internal instance key and values of one or more attributes.

8. The computer readable storage medium of claim 7, wherein each rule is a conditional rule that is associated with one or more conditions.

9. The computer readable storage medium of claim 7, wherein the plurality of objects comprise documents, emails, customers, and products.

10. The computer readable storage medium of claim 9, wherein:

attributes associated with the documents object comprise: document identifier, document title, creation date, and document content;

attributes associated with the emails object comprise: email-address of a sender sending an email, email-address of one or more receivers of the email, sent date of the email, received date of the email, subject of the email, and a body of the email;

attributes associated with the customers object comprise: a customer identifier, a first name, a last name, a company, a physical address, phone number, and an email address; and attributes associated with the products object comprise: product identifier and name of a product.

11. The computer readable storage medium of claim 7, wherein each instance of the first object comprises a corresponding value of a first attribute of the first object and respective values of other attributes of the of the first object.

12. The computer readable storage medium of claim 7, wherein the first object is a customer object that has attributes comprising a customer identifier, a first name, a last name, a company, a physical address, phone number, and an email address.

13. The computer readable storage medium of claim 12, wherein each instance of the customer object comprises a value of the customer identifier attribute and corresponding values of other attributes of the customer object.

14. The computer readable storage medium of claim 7, wherein the second object is a document object that has attributes comprising a document identifier, a document title, a creation date, and document content.

15. The computer readable storage medium of claim 14, wherein each instance of the document object comprises a value of the document identifier attribute and corresponding values of the other attributes of the document object.

16. The computer readable storage medium of claim 7, wherein:

the first object is a customer object that has attributes comprising a customer identifier attribute;

the second object is a document object that has attributes comprising a document identifier attribute; and the cross-relationships characterize matches between values of the customer identifier attribute and values of the document identifier attribute.

17. The method of claim 1, wherein each of one or more objects include structured data and unstructured data.

18. The system of claim 2, wherein each of one or more objects include structured data and unstructured data.

* * * * *